United States Patent [19]

Veenstra et al.

[11] Patent Number: 5,736,272
[45] Date of Patent: Apr. 7, 1998

[54] BATTERY TRAY

[75] Inventors: Michael Jon Veenstra, Allen Park, Mich.; John Clark; Debra Sojka, both of Granger, Ind.

[73] Assignee: Ford Global Technologies, Inc., Dearborn, Mich.

[21] Appl. No.: 786,492

[22] Filed: Jan. 21, 1997

[51] Int. Cl.⁶ ........................................ H01M 2/10
[52] U.S. Cl. .................. 429/99; 429/97; 429/100; 429/161; 429/163
[58] Field of Search ..................... 429/96, 97, 98, 429/99, 100, 123, 160, 161, 163, 71

[56] References Cited

U.S. PATENT DOCUMENTS

| | | | |
|---|---|---|---|
| 5,304,434 | 4/1994 | Stone | 429/99 |
| 5,378,555 | 1/1995 | Waters et al. | 429/99 |
| 5,403,679 | 4/1995 | Stone | 429/99 |
| 5,437,939 | 8/1995 | Beckley | 429/99 |
| 5,639,571 | 6/1997 | Waters et al. | 429/99 |

OTHER PUBLICATIONS

Linden, "Handbook of Batteries and Fuel Cells", McGraw-Hill, p. A-9 (no month available), 1984.

*Primary Examiner*—Stephen Kalafut
*Assistant Examiner*—Carol Chaney
*Attorney, Agent, or Firm*—Damian Porcari

[57] ABSTRACT

A battery tray assembly that includes a first member having a first interface surface and a first battery retaining surface. The first retaining surface retains a top surface of a first battery. A second member having a second interface surface and a second battery retaining surface retains a bottom surface of the second battery. A means for securing the first interface surface to the second interface surface joins the two batteries in a fixed position. The securing means may include a series of projections on one or both separator members and corresponding slots. A greater number of slots than projections enables a plurality of orientations between the first and second members.

7 Claims, 3 Drawing Sheets

BATTERY TRAY

BACKGROUND OF THE INVENTION

1. Field of the Invention

The present invention relates to a separator for a battery assembly having a series of stacked batteries. More specifically, the invention relates to a modular battery separator especially useful for electric vehicles having a series of stacked batteries.

2. Description of the Related Art

Electric vehicles require a battery pack having both the high voltage and large current capacity. Battery packs generally comprise a number of individual batteries interconnected to provide the voltage and current capacity needed to drive the vehicle. To ease assembly of battery packs and to reduce battery pack cost, a standard battery size is generally used. This standard battery size has the dimensions of 175mm height, 116 mm width and 388 mm length. Because this standard battery is used in a wide variety of electric vehicles, it is necessary to package these batteries into larger groups of batteries called a battery pack. Heretofore, the packaging needed to assemble a battery pack was customized for the particular application used. Because of the relatively large size of the battery pack, it was constructed in a manner to fit the available space within the vehicle. Some batteries are stacked directly atop another row while other batteries have transverse or mediate spacing. Each battery spacing required individual customized separators to be fabricated to space the batteries in the desired ordination. Due to the present limited volume of electric vehicles, customized separators increased the cost of the battery pack.

It is also possible that the same vehicle has two or more battery pack configurations. One configuration would have a few batteries to save cost and weight. Another configuration may have more batteries to provide greater range. In each case, it is desirable to use the same separators and simply add additional batteries to the pack.

It is desirable to have a modular battery spacer and separator that is useful in a wide configuration of battery positions. A modular battery spacer reduces the tooling costs for manufacturing the separator and eases assembly of the battery pack because fewer components are needed in the battery assembly plant. It is a further desire that the modular battery spacer firmly retain the battery in position while maintaining an equal distance between columns, rows and layers of batteries. It is a further desire of the present invention that the battery separator allow a space between the batteries for electrical connections, vents and thermal management plates.

These and other advantages features and objects of the present invention will become more apparent to those of ordinal skill in the art upon reference to the following detailed description and attached drawings.

SUMMARY OF THE INVENTION

The present invention relates to a battery separator assembly that includes a first member having a first interface surface and a first battery retaining surface. The first retaining surface retains a top surface of a first battery. A second member having a second interface surface and a second battery retaining surface retains a bottom surface of the second battery. A means for securing the first interface surface to the second interface surface joins the two batteries in a fixed position. The securing means may include a series of projections on one or both separator members and corresponding slots. A greater number of slots than projections enables a plurality of orientations between the first and second members. The separator members are made from an injection molded thermoplastic material and are low cost and light weight. The modular construction allows the first and second members to be positioned in a wide variety of orientations to enable the use of standard batteries sizes.

The invention is particularly useful in battery packs for electric vehicles having a large number of separate interconnected batteries. The batteries are generally positioned in a number of stacked rows; each row carrying the weight of the batteries placed atop it. The first retaining surface generally engages a shoulder area on the batteries which is reinforced to carry the weight of other batteries. This construction allows for the batteries to be fabricated with terminal posts and exhaust vents on the top surface. Placing the terminal posts and exhaust vents on the top surface greatly simplifies manufacturing for batteries having liquid electrolyte because the terminal post and exhaust vents do not require extensive waterproof sealing. The batteries are assembled into packs and retained within a housing in an electric vehicle.

DETAILED DESCRIPTION OF THE PREFERRED EMBODIMENT

Figure 1:
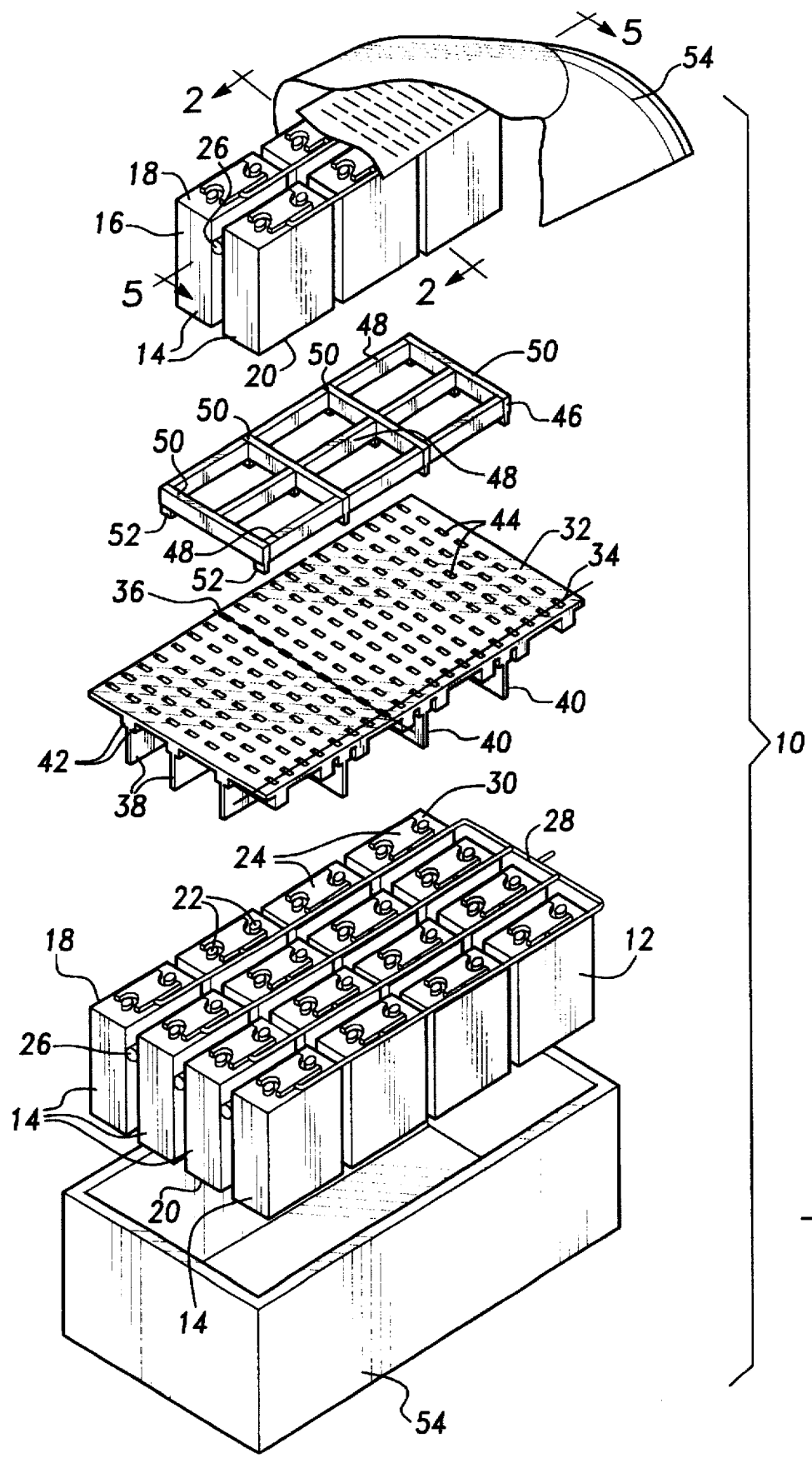
FIG. 1 is a exploded view in partial cross-section of a battery pack and housing.

Illustrated in FIG. 1 is an exploded view, partially cut away, of a battery pack 10 useful for providing the traction force of an electric vehicle. The battery pack 10 comprises two layers of interconnected batteries. A first lower layer 12 has four rows of batteries, each row containing four batteries. Each battery 14 is made up of a number of internal cells (not shown). A second upper layer of batteries 16 includes two rows of batteries each row having three batteries. The layers 12 and 16 are stacked one atop the other and are held in an upright orientation. The layers 12 and 16 include a top surface 18 and a bottom 20. Top surface 18 includes electrode terminals 22 and gas vents 24. The terminals 22 are generally connected in series by connectors 26. A gas conduit 28 is connected to each gas vent 24 and centrally vents gasses expelled from the batteries 14. The battery top surface 18 includes a shoulder area 30 designed to carry the weight of the upper layers of batteries. The shoulder area 30 generally encircles the electrode terminal 22 and the gas vents 24.

A first member 32 is juxtaposed the top surface 18. The first member 32 carries the weight of the second layer 16. The first member 32 includes a series of equally spaced parallel rows 34 and columns 36. The rows and columns 34, 36 serve to provide a wide variety of positions atop which a second layer of batteries may be placed. Projecting separators 38 fit between the rows of batteries 14 and space the rows a distance apart. Projecting separators 40 are positioned transverse to the separators 38 and divide the batteries 14 into evenly spaced columns as shown. The separators 38 and 40 act to keep the top surfaces 18 of the batteries 14 evenly spaced apart from one another and to create a space between the batteries 14 for mechanisms such as the electrical connectors 26 or heating or cooling mechanisms (not shown).

The first member 32 also includes projecting retaining surfaces 42 that engage the shoulder area 30. The retaining surfaces 42 transfer the weight of the second layer 16 to the first layer 12. The first member 32 also includes a plurality of slots 44. The slots 44 are arranged in a series of equally spaced rows. Each row of slots 44 forms a linearly extending position for the placement of the second layer 16. The slots 44 are equally spaced and form a series of columns. Each column provides a transverse position for the placement of the second layer 16.

Juxtaposed the first member 32 is a second member 46 which includes linearly extending dividers 48 and transverse dividers 50. The dividers 48 and 50 act to space the lower portion of batteries 14 a fixed distance apart. Projecting tabs 52 extend downwardly from the second member 46 and are sized to engage the slots 44. The layers 12 and 16 are stacked one atop the other and placed within a housing 54. The layers may be secured to one another by the housing 54 or alternatively, straps, bands or posts may fix the layers 12 and 16 firmly together (not shown).

Figure 2:
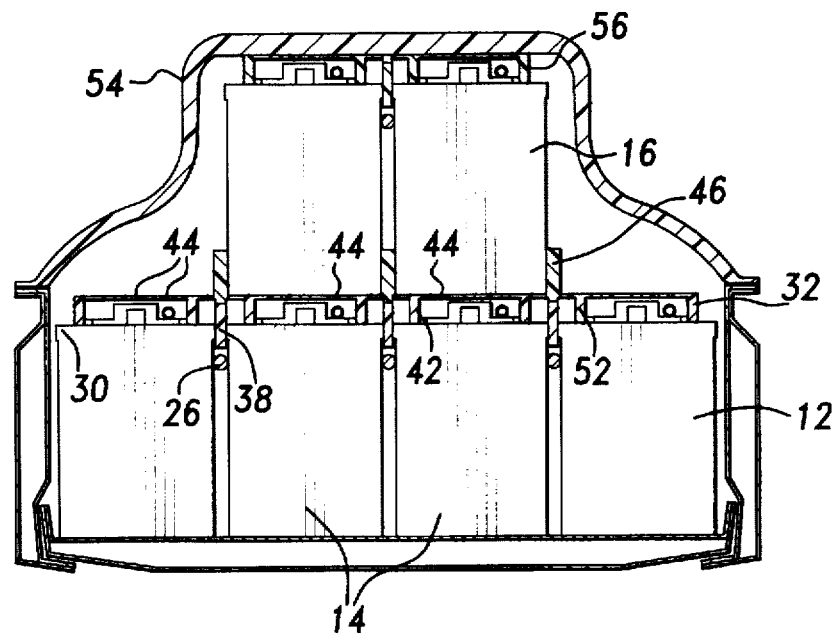
FIG. 2 is a cross-sectional view of the battery pack and housing illustrated in FIG. 1 taken along the line 2—2.

The separator members 32 and 46 may be configured in a variety of positions to enable a number of battery placements. Illustrated in FIG. 2 is a cross-sectional view of the battery pack 10 taken along the line 2—2 in FIG. 1. The first layer 12 is placed within the housing 54. The housing 54 acts to space the lower portion of the first layer 12. The first separator member 32 is placed atop the first layer 12. The retaining surfaces 42 engage the shoulder area 30 as shown. The dividers 38 extend along a side of the battery 14. Not shown in this cross-sectional view are the dividers 40 that extend transversely to the dividers 38. The dividers 38 and 40 space the upper portion of the batteries 14 a fixed distance apart. The connectors 26 are placed intermediate of the batteries 14 and connect the batteries 14 in series. The second separator member 46 is placed atop the first member 32. The tabs 52 engage the slots 44 and retain the second spacer member 46 against the first spacer member 32. A third spacer member 56 is similar in construction to first spacer member 32 but is designed to only overlay two rows of batteries.

Figure 3:
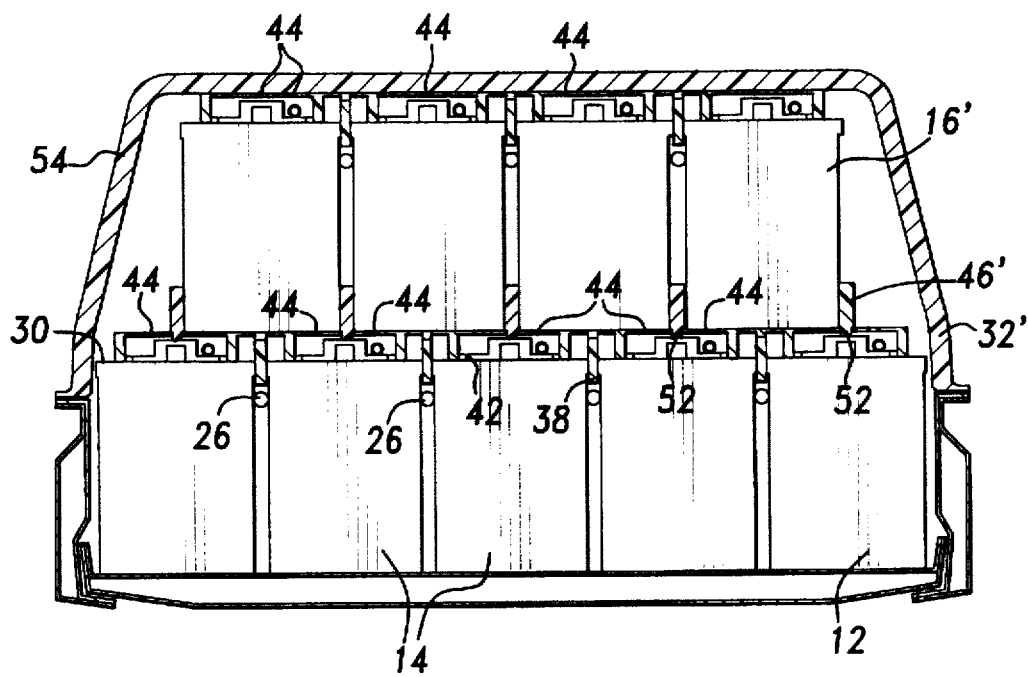
FIG. 3 is an alternative embodiment of the illustration in FIG. 2 showing the batteries in the second row offset from the batteries in the first row.

The design illustrated in FIGS. 1 and 2 provides a flexible mechanism for stacking batteries. The batteries illustrated in FIG. 2 are positioned so that rows of batteries are directly stacked one atop the other. Using the same general design for the first and second spacer members 32' and 46', the second layer 16' may be evenly spaced bridging two rows of batteries as shown in FIG. 3. The projections 52 merely engage different slots 44 in the first member 32'.

Figure 4:
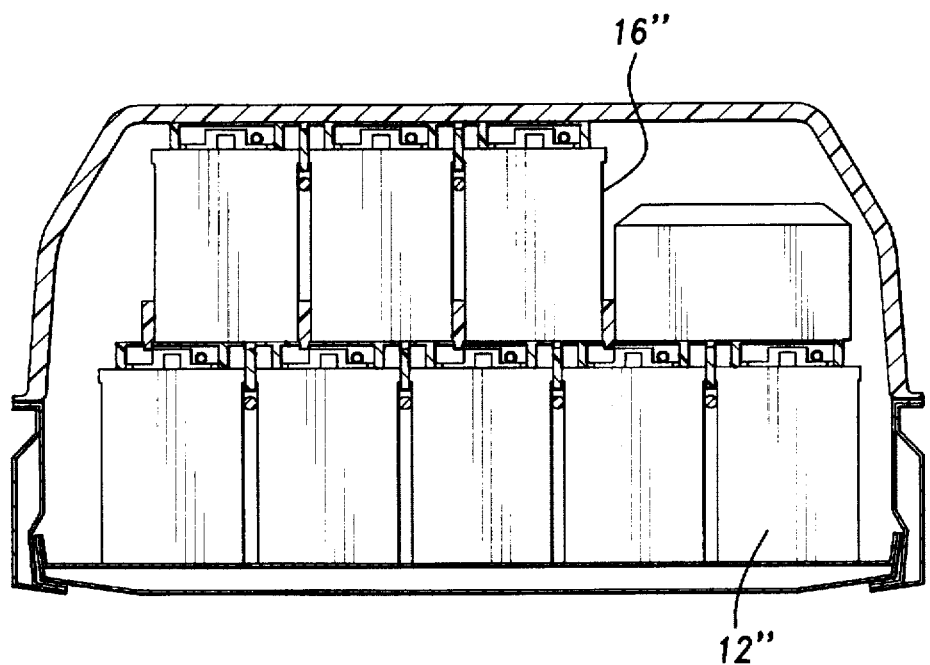
FIG. 4 is yet another alternative embodiment of the invention as illustrated in FIG. 2 showing the batteries in the second row partially offset from the batteries in the first row.
Figure 5:
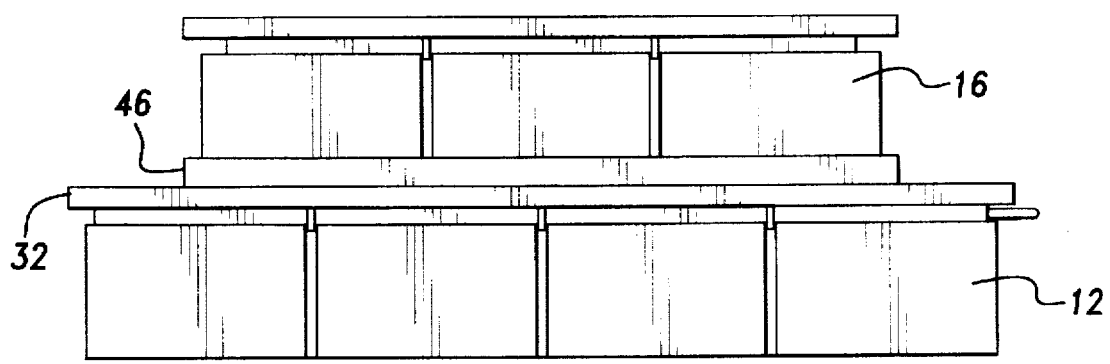
FIG. 5 is a cross-sectional view of still another alternative embodiment of the invention as illustrated in FIG. 1, taken along the line 5—5.

FIG. 4 illustrates a second row 16" positioned partially offset the lower rows in the layer 12". Using a variety of first and second spacer members 32, 46, any number of rows and columns may be combined in the upper and lower layers 12 and 16. The invention may also be practiced by moving the second layer 16 forward or rearward as illustrated in FIG. 5.

The invention describes a modular battery separator assembly that enables a standard battery to be arranged in a variety of configurations within a battery pack. By using different lengths of first and second separators members 32, 46, any number of batteries may be stacked in rows or columns either aligned, offset or partially offset. These and other modifications and adaptations of the present invention are intended to fall within the claim coverage of the following claims.

What is claimed:

1. A battery tray assembly comprising:

a first member having a first interface surface and a first battery retaining surface, said first retaining surface retaining a top surface of a first shoulder area of a first battery;

a second member having a second interface surface and a second battery retaining surface, said second retaining surface retaining a bottom surface of a second battery, and a means for securing said first interface surface to said second interface surface, whereby said first and second batteries are retained in a fixed position having said first battery top surface shoulder area supporting the weight of said second member.

2. The battery tray assembly of claim 1, wherein said top surface further comprising electrode terminals, said first retaining surface spaces said first member a distance apart from said terminals to allow for the attachment of connectors onto said terminals.

3. The battery tray assembly of claim 1, wherein said top surface further comprises out-gassing conduits, said first retaining surface spaces said first member a distance apart from said conduits.

4. The battery tray assembly of claim 1, wherein said first member further comprises a first spacer extending along a side surface of said first battery.

5. The battery tray assembly of claim 4, where said first member further comprises a second spacer traverse from said first spacer and extending along another side surface of said first battery.

6. A modular battery assembly tray assembly allowing two or more row of batteries to be stacked in a plurality of orientations comprising:

a first member having a first interface surface and a first battery retaining surface, said first retaining surface retaining a top surface shoulder area of a first row of batteries, said first interface surface having at least a first, second and third row of slots; and a second member having a second interface surface and a second battery retaining surface, said second retaining surface retaining the bottom surface of a second row of batteries, said second interface surface having a row of projections sized to engage said slots, whereby said second row of batteries may be retained in a first position when said projections are inserted in said first row of slots, and retained in a second position when said projections are inserted in said second row of slots and retained in a third position when said projections are inserted in said third row of slots.

7. A battery tray assembly comprising:

a first member having a first interface surface comprising a row of slots and a first battery retaining surface, said first retaining surface retaining a top surface shoulder area of a first battery;

a second member having a second interface surface and a second battery retaining surface, said second retaining surface retaining the bottom surface of a second row of batteries, said second interface surface having a row of projections sized to engage said slots, said first interface surface secured to said second interface surface by insertion of said projections into said slots, whereby said first and second batteries are retained in a fixed position having said first battery top surface shoulder area supporting the weight of said second member.

* * * * *